US005419049A

United States Patent [19]

MacArthur-Onslow

[11] Patent Number: 5,419,049

[45] Date of Patent: May 30, 1995

[54] FOLDABLE EATING UTENSIL

[76] Inventor: Rohan J. MacArthur-Onslow, 1/4 Greycliffe Avenue, Vaucluse NSW 2030, Australia

[21] Appl. No.: 303,193

[22] Filed: Sep. 8, 1994

[51] Int. Cl.[6] ...................... A47J 43/28; A47G 21/00; A47G 21/02

[52] U.S. Cl. ........................................ 30/322; 30/324; 229/401

[58] Field of Search ................................ 30/322-328, 30/332, 47; 229/1.5 C

[56] References Cited

U.S. PATENT DOCUMENTS

| | | | |
|---|---|---|---|
| 2,598,987 | 6/1952 | Franzen | 229/1.5 C |
| 2,812,577 | 11/1957 | Leibow | 30/324 |
| 4,060,176 | 11/1977 | Tobiasson | 229/1.5 C X |
| 4,393,988 | 7/1983 | Burke | 229/1.5 C X |
| 4,615,120 | 10/1986 | Newman | 30/324 |
| 4,826,033 | 5/1989 | Satoh | 30/322 |
| 4,841,637 | 6/1989 | Scholzen | 30/125 |

FOREIGN PATENT DOCUMENTS

| | | |
|---|---|---|
| 897092 | 3/1945 | France . |
| 3828330 | 2/1990 | Germany . |

*Primary Examiner*—Douglas D. Watts

*Attorney, Agent, or Firm*—Laubecher & Laubecher

[57] ABSTRACT

A foldable eating utensil includes an elongate handle member having a food-engaging blade extending integrally from one end thereof when operatively disposed, the blade being hingedly connected about a transverse axis to the inner edge of a connector plate of the handle member extending laterally between spaced handle arms of the handle member which define therebetween an opening to receive the blade to lie coplanar with the handle member when the blade is hinged to storage disposition, the blade including a longitudinally extending neck portion at its hinged connection to the connector plate and adapted to lie against the connector plate when operatively disposed, the handle arms being foldable each about a lengthwise axis adjacent the connector plate, and the parts being so made and arranged that when the blade has been hinged to operative disposition, the handle arms may be folded digitally towards each other and brought to and held in co-acting relationship in which parts of the handle member engage the blade at its neck portion in such manner as to restrain the blade against movement away from operative disposition.

11 Claims, 3 Drawing Sheets

FOLDABLE EATING UTENSIL

This invention relates to eating utensils and in particular to an eating utensil for the consumption of vended food products.

Many types of foods, such as yoghurt and ice cream, are packaged in individual serving containers. Eating utensils of various forms have therefore been devised to be included with the sale of the containers for immediate consumption of their contents. Such a utensil may be a plastic spoon, fork or wooden spatula adapted to be individually issued with each container. It is desirable, however, to provide a utensil which may be packaged with the container and is suitably not larger than one or more specific dimensions of the container. In particular it is desirable that there be provided an eating utensil which is planar in storage disposition and is of suitable size to be packaged with a container and also foldable to an operative disposition suitable for use in scooping out contents of the container.

The prior art includes two U.S. Pat. Nos. 4,060,176 of Tobiasson J. R. and 4,393,988 of Burke M., each showing a food container lid which is convertible into a spoon. The spoon in each case includes a flap which folds outwardly from the plane of the lid through 180° so that the flap extends outwardly from the lid to be used as a spoon bowl to scoop up the contents of the container. Each of these devices has the disadvantage that the flap is freely foldable through the 180°, with the result that for example, when prising loose a portion of frozen ice cream from the rest of the contents in the container, said portion may be suddenly flicked off the flap when the portion is forcibly caused to become free.

In Australian Patent No. 117564 of Stanley Rogers and Company Pty Ltd there is disclosed a folding utensil adapted to fold from a storage disposition to an operative disposition and which includes two members, namely a handle and a spoon-head removably attached to each other. Manufacturing this utensil, however, requires making the two members separately and then having to couple them together. This increases the costs of producing the utensil and decreases its reliability in operation due to the members having to couple together correctly or otherwise fail to operate.

Notwithstanding the prior art as aforementioned, I have considered there remains a need for substantial improvements in foldable eating utensils, particularly to overcome present disadvantages associated with the prior art. Thus, it is a principal object of my invention to provide a novel form of eating utensil which may be easily folded, inexpensive to manufacture and reliable and efficient in use. In particular, the invention aims to provide a folding eating utensil adapted to be formed from sheet material or moulded from plastics in a substantially flat configuration.

DISCLOSURE OF THE INVENTION

With the foregoing and other objects in view, the invention according to one aspect resides broadly in a foldable eating utensil including an elongate handle member having a food-engaging blade extending integrally from one end thereof when operatively disposed, said blade being hingedly connected about a transverse axis to the inner edge of a connector plate of the handle member extending laterally between spaced handle arms of the handle member which define therebetween an opening to receive said blade to lie coplanar with said handle member when said blade is hinged to storage disposition, said blade including a longitudinally extending neck portion at its hinged connection to said connector plate and adapted to lie against said connector plate when operatively disposed, said handle arms being foldable each about a lengthwise axis adjacent said connector plate, and the parts being so made and arranged that when the blade has been hinged to operative disposition, said handle arms may be folded digitally towards each other and brought to and held in co-acting relationship in which parts of said handle member engage said blade at its neck portion in such manner as to restrain the blade against movement away from operative disposition.

According to another aspect of the invention, particularly applicable to a spoon-type or fork-type of food-engaging blade, the invention resides broadly in a foldable eating utensil including an elongate handle member having a food-engaging blade extending integrally from one end thereof when operatively disposed, said blade being hingedly connected about a transverse axis to the inner edge of a connector plate of the handle member extending laterally between spaced handle arms of the handle member which define therebetween an opening to receive said blade to lie coplanar with said handle member when said blade is hinged to storage disposition, said blade including a longitudinally extending neck portion at its hinged connection to said connector plate and adapted to lie against said connector plate when operatively disposed, said handle arms being foldable each about a lengthwise axis passing through the respective adjacent side edge of said connector plate, and the parts being so made and arranged that when the blade has been hinged to operative disposition, said handle arms may be folded digitally towards each other and brought to and held in co-acting relationship in which their distal ends adjacent said connector plate engage said blade at its neck portion in such manner as to restrain the blade against movement away from said operative disposition.

Preferably said neck portion is of elongate strip-like form and is contiguous with a blade body portion which extends laterally beyond each longitudinal side edge of said neck portion, a shoulder being defined by the junction of each said side edge with said blade body portion. It is also preferred that said distal ends of said handle arms adjacent said connector plate are disposed for engaging said shoulders in said operative disposition.

Preferably said shoulders are provided each with a securing lug spaced laterally from the respective said side edge whereby each handle arm in said operative disposition is located between a respective securing lug and the adjacent said side edge. It is also preferred that said distal ends of said handle arms are provided each with a terminal retention lug spaced from the respective side edge of the connector plate whereby each handle arm in said operative disposition has its retention lug overlying the blade body at the respective shoulder.

Suitably, said handle arms are hingedly connected at their proximal ends whereby the handle member is a continuous loop surrounding said opening, said blade being shaped to be received closely in said opening. Suitably also, said blade is of spoon-like form or fork-like form and is round, oval-shaped or of rectangular shape, being flat or of concave upper surface.

Preferably too, said handle arms are provided with holding means whereby they may be maintained fixedly relative to each other when in their operative disposition. For this purpose said holding means may suitably include interengaging members on the respective arms for snap-action engagement and retention when the arms are brought to their operative dispositions. Other features of the invention will be apparent from the following descriptions.

BEST METHOD OF CARRYING OUT THE INVENTION

In order that the invention may be more readily understood and put into practical effect, reference will now be made to the accompanying drawings, wherein.

Figure 1:
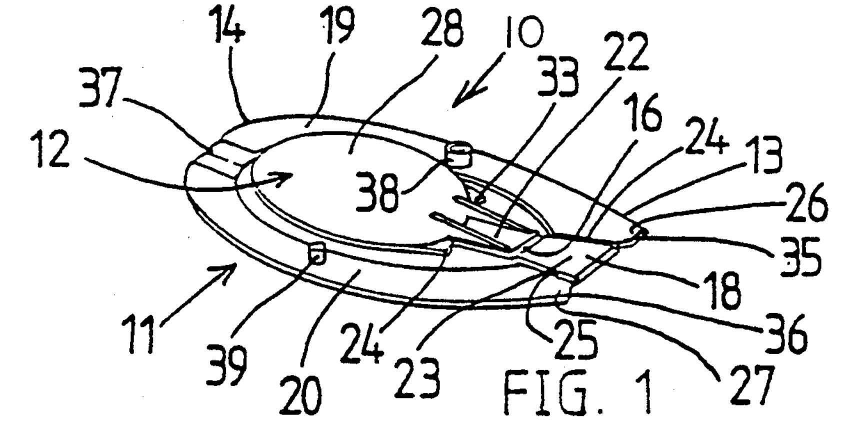
FIG. 1 shows in perspective view from above one preferred embodiment of the novel foldable eating utensil according to the invention, shown in its storage position and in which, by way of example, the blade is of dished spoon-like form.
Figure 2:
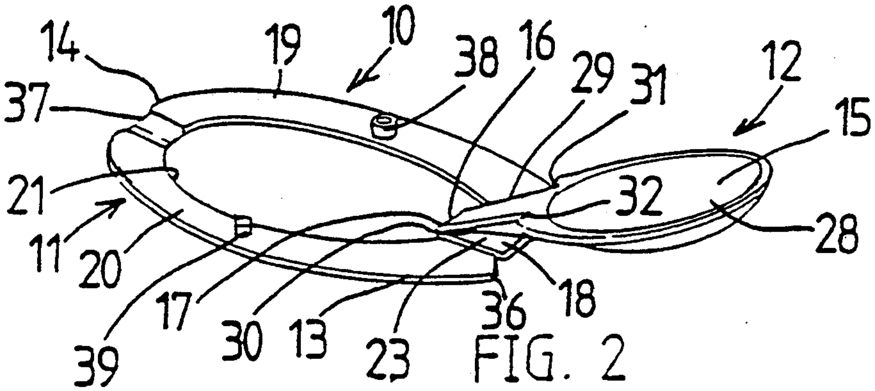
FIG. 2 shows in similar perspective view the same utensil as in FIG. 1 with the blade (of spoon-like form) being hinged from storage disposition to be close to operative disposition.
Figure 3:
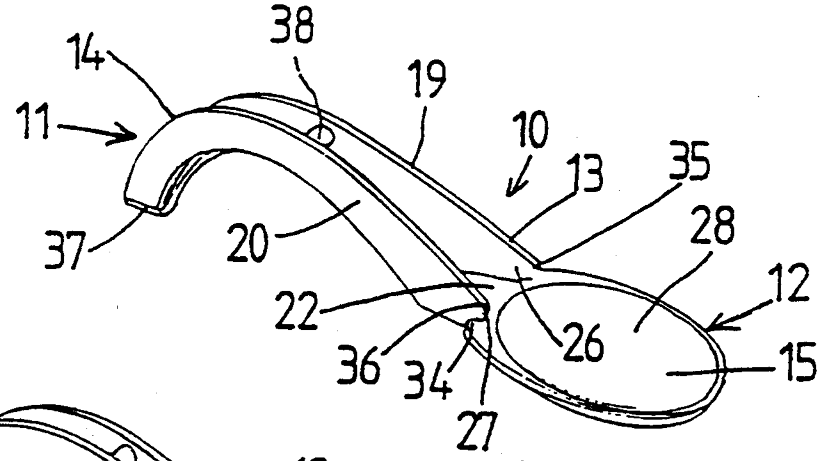
FIG. 3 shows in perspective view from above the utensil of FIGS. 1 and 2, having the handle member and blade in their operative dispositions.

Referring initially to FIGS. 1 to 3 of the drawings, there is shown a utensil indicated generally by the numeral 10 including an elongate handle member 11 having a food-engaging blade 12 extending integrally from one end 13 thereof when operatively disposed with the food-engaging blade 12 extended as shown in FIG. 3, the said end 13 of the handle member 11 being the distal end while the other end 14 of the handle member is the proximate end adapted to be held digitally when the utensil is being used. In this instance the utensil 10 is formed by moulding of plastics material facilitating the blade 12 being made of dished form with a concave surface 15 for scooping up materials. On the other hand, the utensil 10 could be formed from a blank of sheet material which in certain instances could be paper or cardboard, especially cardboard with a plasticised exterior coating on both surfaces. Preferably however, it would be made from rigid plastics material but reduced in thickness at hinge locations according to known techniques. The utensil 10 may be formed by stamping or cutting or other conventional processes.

The blade 11 is hingedly connected about a transverse axis line 16 to the inner edge 17 of a connector plate 18 of the handle member 11. It will be seen that the connector plate 18 extends laterally between spaced handle arms 19, 20 of the handle member 11 so that the arms define therebetween an opening 21 to receive the blade 12 in such manner that the latter will lie coplanar with said handle member 11 as shown in FIG. 1 when the blade 12 is hinged to storage disposition.

The blade 12 includes a longitudinally extending neck portion 22 at its hinged connection 16 with the connector plate 18 and is adapted to lie against the upper surface 23 of the connector plate 18 when operatively disposed. As apparent from FIG. 3, the handle arms 19, 20 are foldable each about a transverse axis passing through the respective adjacent side edge 24, 25 (see FIGS. 1 and 2) of the connector plate 18. Basically, as will be apparent from FIGS. 1 to 3, the parts are so made and arranged that when the blade 12 has been hinged to operative disposition as shown in FIG. 3, the handle arms 19, 20 may be folded digitally towards each other and brought to and held in co-acting relationship with their distal ends 26, 27 adjacent the connector plate 18 engaging the blade 12 at the neck portion 22 in such manner as to restrain the blade against movement away from the operative disposition as shown in FIG. 3.

It will be noted that the neck portion 22 is of elongate strip-like form with a blade body portion 28 contiguous therewith and extending laterally beyond each longitudinal side edge 29, 30 (see FIG. 2) of the neck portion 22, a shoulder 31, 32 being defined by the junction of each said side edge 29, 30 with said blade body portion 28. It will be noted that the distal ends 26, 27 of the handle arms 19, 20 adjacent the connector plate 18 are disposed for engaging said shoulders 31, 32 in said operative disposition.

In the embodiment shown in FIGS. 1 to 3, the shoulders 31, 32 are provided each with a securing lug 33, 34 spaced laterally from the respective said side edge 29, 30 whereby each handle arm 19, 20 in its operative disposition is located between a respective securing lug 33, 34 and the adjacent said side edge 29, 30. Also in this embodiment, the distal ends 26, 27 of the handle arms 19, 20 are provided each with a terminal retention lug 35, 36 spaced from the respective side edge 24, 25 of the connector plate 18 whereby each handle arm 19, 20 in said operative disposition has its retention lug 35, 36 overlying the blade body 28 at the respective shoulder 31, 32. As will be seen from FIG. 2, the handle arms 19, 20 are hingedly interconnected by a portion 37 at their proximal ends whereby the handle member 11 is a continous loop surrounding said opening 21, the blade 12 being shaped to be received closely in the opening 21.

Also shown in the drawings in FIG. 1 to 3 are interengaging holding members 38 and 39 on the respective arms 19, 20, one holding member having an opening therein to accommodate the other in a snap action whereby the arms may be maintained fixedly relative to each other when in their operative dispositions, as shown in FIG. 3. This will retain the arms in that disposition until forcibly moved apart against the action of the snap-type retention arising from the design and dimensioning of the two holding members 38, 39.

Figure 4:
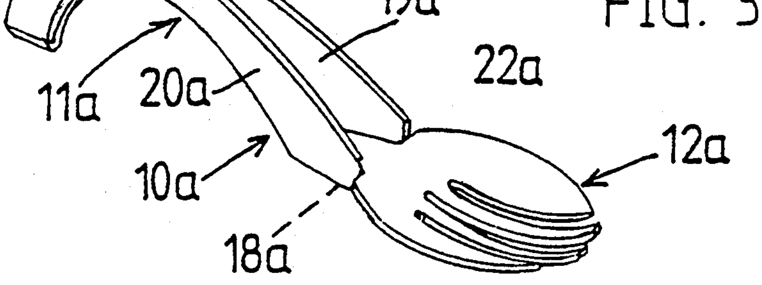
FIG. 4 shows in perspective view a modified embodiment in its operative disposition, the blade being of fork-like form.

Referring now to FIG. 4 of the drawings, the utensil 10*a* therein has the same components as those of the embodiment of FIGS. 1 to 3, suffixed by the letter "*a*", but with the food-engaging blade 12a being of fork-like form. The handle member 11a is exactly as before, and the width of the blade 12a in relation to the width of the connector plate 18a and neck portion 22a result in all actions being the same as for those described with reference to FIGS. 1 to 3.

Figure 5:
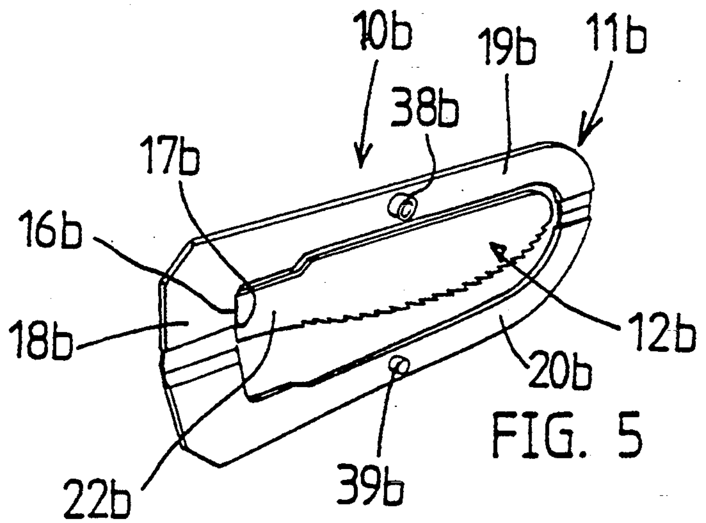
FIG. 5 shows in perspective view another embodiment of the invention, the blade being of knife-like form, shown in its storage disposition.
Figure 6:
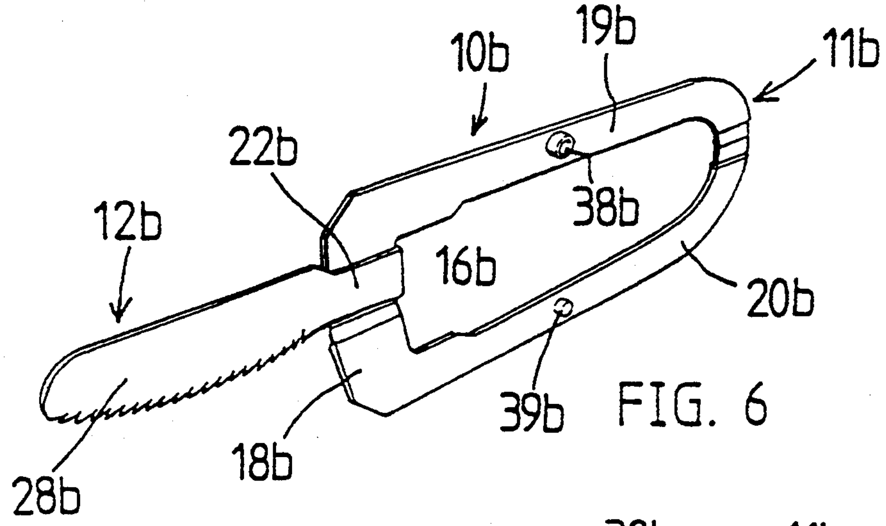
FIG. 6 shows in perspective view the utensil of FIG. 5 with the blade in its operative disposition and with the handle still in its storage disposition.
Figure 7:
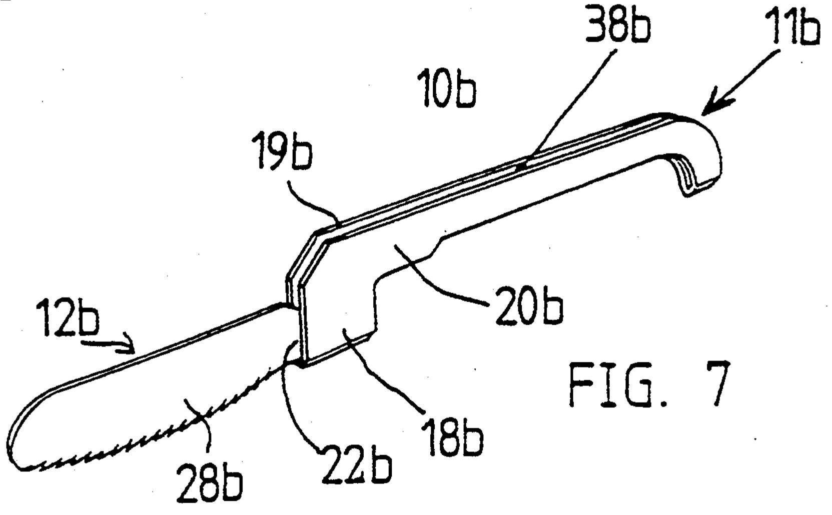
FIG. 7 shows in perspective view the utensil of FIGS. 5 and 6 with the blade and handle member in their operative dispositions.

The embodiment of FIGS. 5 to 7 relates to a similar construction but with differences adapting it to a knife utensil rather than a spoon utensil. This is indicated generally by the numeral 10b and corresponding parts have the same numerals as for FIGS. 1 to 3 but suffixed by the letter "*b*". The utensil 10b has a handle member 11b formed integrally with a food-engaging blade 12b which is of rectangular knife-like form, its body portion 28b being integral with a neck portion 22b which in this instance is hingedly connected along a transverse axis line 16b to the inner edge 17b of a connector plate 18b which is formed in two spaced but hingedly connected parts, the neck portion 22b being integral with one part only so that when the two handle arms 19b, 20b are pivoted to the disposition shown in FIG. 7, the neck portion 22b will be gripped between the two said portions of the connector plate 18b. Holding members 38b and 39b act to hold the arms together, with the other features being clearly apparent from FIGS. 5 to 7.

Figure 8:
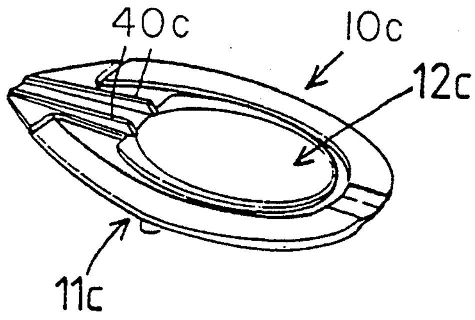
FIG. 8 shows in perspective view from above a further embodiment of the invention shown in its storage disposition.
Figure 9:
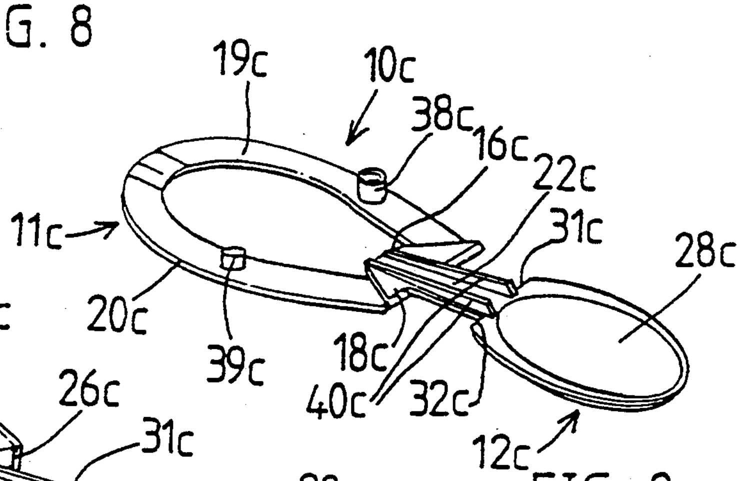
FIG. 9 shows in perspective view the utensil of FIG. 8 with the blade in its operative disposition.
Figure 10:
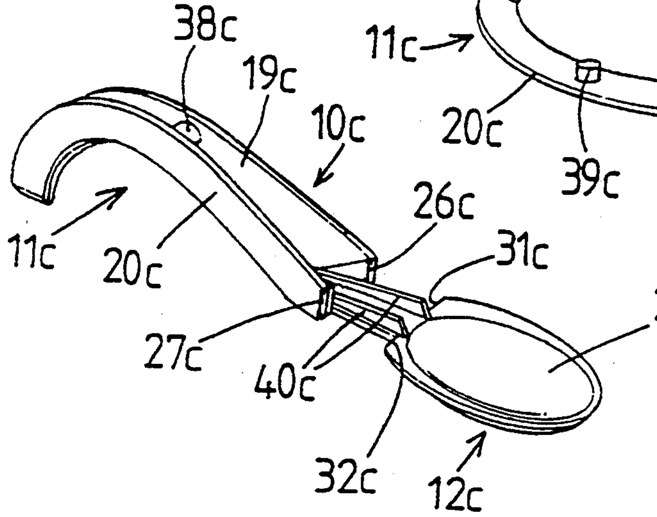
FIG. 10 shows in perspective view the utensil of FIGS. 8 and 9 in its operative disposition.

Turning now to the embodiment shown in FIGS. 8 to 10 the utensil indicated at 10c has its components marked with the same numerals as before but suffixed by the letter "*c*". The handle member 11c is generally similar to earlier embodiments, but the neck portion 22c of the food-engaging blade 12c is designed to extend operatively without the distal ends 26c, 27c of the handle arms 19c, 20c reaching the shoulders 31c, 32c at the junction of the neck portion 22c with the blade body portion 28c. For strengthing purposes, the neck portion 22c may be provided with integral side ribs 40.

Figure 11:
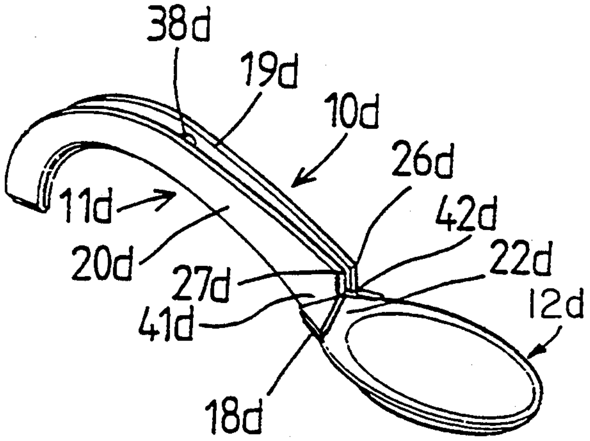
FIG. 11 shows in perspective view from above a further embodiment of the invention shown in its operative disposition.

Finally, to illustrate the broad scope of the invention, FIG. 11 illustrates a utensil 10d having a handle member 11d generally similar to those described earlier and a similar food-engaging blade 12d, but the neck portion 22d is shortened to lie on the connector plate 18d without any locking effects by shoulders or securing lugs or retention lugs (of the type shown as 31, 32, 33, 34, 35, 36, in FIGS. 1 to 3). Instead, at the distal ends 26d, 27d of the handle arms 19d, 20d, the latter are foldable to be kinked in at 41 and 42 and overlie the neck portion 22d to retain it against the connector plate 18d and thus achieve the same results when the arms 19d, 20d are held tightly together by holding members 38d or other means in the pertinent area at the neck portion 22d.

The use of the invention in its various embodiments will be self-apparent from the drawings and preceding description. While moulded utensils of these types can be inserted loosely or packaged into containers very easily, modified embodiments made from press sheet material can be secured rigidly against a face of a container if so desired, being not larger than one or more specific dimensions of the container for that purpose.

The several embodiments will illustrate how many further modifications will be apparent to persons skilled in the art, without departing from the broad scope and ambit of the invention, as defined by the appended claims.

I claim:

1. A foldable eating utensil including an elongate handle member having a food-engaging blade extending integrally from one end thereof when operatively disposed, said blade being hingedly connected about a transverse axis to the inner edge of a connector plate of the handle member extending laterally between spaced handle arms of the handle member which define therebetween an opening to receive said blade to lie coplanar with said handle member when said blade is hinged to storage disposition, said blade including a longitudinally extending neck portion at its hinged connection to said connector plate and adapted to lie against said connector plate when operatively disposed, said handle arms being foldable each about a lengthwise axis adjacent said connector plate, and the parts being so made and arranged that when the blade has been hinged to operative disposition, said handle arms may be folded digitally towards each other and brought to and held in co-acting relationship in which parts of said handle member engage said blade at its neck portion in such manner as to restrain the blade against movement away from operative disposition.

2. A foldable eating utensil including an elongate handle member having a food-engaging blade extending integrally from one end thereof when operatively disposed, said blade being hingedly connected about a transverse axis to the inner edge of a connector plate of the handle member extending laterally between spaced handle arms of the handle member which define therebetween an opening to receive said blade to lie coplanar with said handle member when said blade is hinged to storage disposition, said blade including a longitudinally extending neck portion at its hinged connection to said connector plate and adapted to lie against said connector plate when operatively disposed, said handle arms being foldable each about a lengthwise axis passing through the respective adjacent side edge of said connector plate, and the parts being so made and arranged that when the blade has been hinged to operative disposition, said handle arms may be folded digitally towards each other and brought to and held in co-acting relationship in which their distal ends adjacent said connector plate engage said blade at its neck portion in such manner as to restrain the blade against movement away from operative disposition.

3. A folding eating utensil, according to claim 2, wherein said neck portion is of elongate strip-like form and is contiguous with a blade body portion which extends laterally beyond each longitudinal side edge of said neck portion, a shoulder being defined by the junction of each said side edge with said blade body portion.

4. A folding eating utensil, according to claim 3, wherein said distal ends of said handle arms adjacent said connector plate are disposed for engaging said shoulders in said operative disposition.

5. A folding eating utensil, according to claim 4 wherein said shoulders are provided each with a securing lug spaced laterally from the respective said side edge whereby each handle arm in said operative disposition is located between a respective securing lug and the adjacent said side edge.

6. A folding eating utensil, according to claim 4, wherein said distal ends of said handle arms are provided each with a terminal retention lug spaced from the respective side edge of the connector plate whereby each handle arm in said operative disposition has its retention lug overlying the blade body at the respective shoulder.

7. A folding eating utensil, according to claim 2, wherein said handle arms are hingedly connected at their proximal ends whereby the handle member is a continuous loop surrounding said opening, said blade being shaped to be received closely in said opening.

8. A folding eating utensil, according to claim 1, wherein said blade is a substantially rectangular knife blade.

9. A folding eating utensil, according to claim 2, wherein said blade is of spoon-like form or fork-like form and is round, oval-shaped or of rectangular shape, being flat or of concave upper surface.

10. A folding eating utensil, according to claim 1, wherein said handle arms are provided with holding means whereby they may be maintained fixedly relative to each other when in their operative dispositions.

11. A folding eating utensil, according to claim 10, wherein said holding means include inter-engaging members on the respective arms for snap-action engagement and retention when the arms are brought to their operative dispositions.

* * * * *